(12) United States Patent
Andresen et al.

(10) Patent No.: US 9,989,034 B2
(45) Date of Patent: Jun. 5, 2018

(54) WIND TURBINE CONTROLLER AND METHOD FOR CONTROLLING A POWER PRODUCTION OF A WIND TURBINE

(71) Applicant: Siemens Aktiengesellschaft, Munich (DE)

(72) Inventors: Bjorn Andresen, Ostbirk (DK); Dragan Obradovic, Ottobrunn (DE); Andrei Szabo, Ottobrunn (DE)

(73) Assignee: Siemens Aktiengesellschaft, Munich (DE)

( * ) Notice: Subject to any disclaimer, the term of this patent is extended or adjusted under 35 U.S.C. 154(b) by 339 days.

(21) Appl. No.: 14/714,300

(22) Filed: May 17, 2015

(65) Prior Publication Data
US 2015/0345469 A1    Dec. 3, 2015

(30) Foreign Application Priority Data

May 30, 2014    (EP) .................................... 14170615

(51) Int. Cl.
*G05D 11/00* (2006.01)
*F03D 7/04* (2006.01)
*G05B 15/02* (2006.01)
*F03D 7/02* (2006.01)

(52) U.S. Cl.
CPC ........... *F03D 7/042* (2013.01); *F03D 7/0284* (2013.01); *F03D 7/044* (2013.01); *F03D 7/047* (2013.01); *F03D 7/048* (2013.01); *G05B 15/02* (2013.01); *F05B 2270/337* (2013.01); *F05B 2270/706* (2013.01); *Y02E 10/723* (2013.01)

(58) Field of Classification Search
CPC .............................. F03D 77/042; F03D 7/0284
USPC ........................................................... 700/287
See application file for complete search history.

(56) References Cited

U.S. PATENT DOCUMENTS

| 7,808,126 B2 * | 10/2010 | Stiesdal | ................ | H02J 3/1835 307/57 |
| 2005/0046196 A1 * | 3/2005 | Larsen | .................... | F03D 9/257 290/44 |
| 2011/0187106 A1 * | 8/2011 | Ichinose | ................ | F03D 7/048 290/44 |

(Continued)

FOREIGN PATENT DOCUMENTS

EP                2634420 A1    9/2013

*Primary Examiner* — Mohammad Ali
*Assistant Examiner* — Sheela S Rao
(74) *Attorney, Agent, or Firm* — Beusse Wolter Sanks & Maire

(57) ABSTRACT

A wind turbine controller for controlling power production of a wind turbine is provided. The wind turbine is arranged within a wind farm coupled to a public power network via a point of common coupling. The wind turbine controller has a receiving unit for receiving a measured value of a property of the wind farm taken at the point of common coupling and for receiving a reference value for the property, and a control unit for controlling the power production of the wind turbine by regulating a local property of the wind turbine based on the received measured value and the received reference value such that the measured value of the wind farm taken at the point of common coupling corresponds to the reference value. Further, a wind turbine having such a controller, a wind farm and a method for controlling a power production of a wind turbine are provided.

14 Claims, 2 Drawing Sheets

(56) References Cited

U.S. PATENT DOCUMENTS

2012/0010755 A1   1/2012  Stapelfeldt
2013/0173073 A1*  7/2013  Breeze ................. F03D 7/0284
                                                        700/287

* cited by examiner

WIND TURBINE CONTROLLER AND METHOD FOR CONTROLLING A POWER PRODUCTION OF A WIND TURBINE

CROSS REFERENCE TO RELATED APPLICATIONS

This application claims the benefit of European Application No. EP14170615 filed May 30, 2014, incorporated by reference herein in its entirety.

FIELD OF INVENTION

The present invention relates to a wind turbine controller for controlling a power production of a wind turbine. The present invention further relates to a wind turbine comprising such a controller and to a wind farm comprising a plurality of wind turbines. Moreover, the present invention relates to a method for controlling a power production of a wind turbine.

BACKGROUND OF INVENTION

In a common wind farm control structure, a farm controller (high level controller) is located at the Point of Common Coupling (PCC), i.e. the connection between wind farm and a public grid. As the control structure in the common wind farm control structure is hierarchical, the lower level controllers are located at individual turbines, the so called turbine controllers.

The farm controller has the task to regulate the overall wind farm active power generation and additional variables, for example the voltage, the reactive power or the power factor at the PCC. The farm controller receives current and voltage measurements taken at the PCC, and based on their difference from the corresponding reference values, it provides the voltage set-points for the individual turbines. An implementation of the farm controller can be a PID structure with a possible droop function modifying the reference voltage based on the measured reactive power and possibly modifying the active power reference based on the measured grid frequency.

The turbine controllers regulate a terminal voltage and a turbine active power production, e.g. following the maximum power point tracking, defined by the reference values, i.e. the set-points, defined by the farm controller. This is effectively done by producing the set-points for the Id (based on the active power set point) and Iq (based on the voltage or reactive power set point) current components which are then, if not out of range, generated by the converter.

In such a structure, the farm controller provides the same voltage and often the same active power set-points to all turbine controllers without taking into account their individual situation, such as the grid circuit characteristic, the individual turbine wind exposure, reactive or active power capabilities of the turbines, saturation status etc. Further, the farm controller does not consider the current saturation limits of the turbine controllers, that means of their converters, which might lead to large integral values in the corresponding turbine PI controllers. Further, since such a structure uses hierarchical control loops, the stability analysis of the overall farm control scheme may be very complex since the turbine controller dynamics cannot be neglected with respect to the time constant of the farm controller.

SUMMARY OF INVENTION

It is one object of the present invention to provide an improved controlling of wind turbines within a wind farm.

This and other objects of the invention are solved by independent claims. Embodiments of the invention are described by depended claims.

Accordingly, a wind turbine controller for controlling a power production of a wind turbine is provided, the wind turbine being arranged within a wind farm being coupled to a public power network via a point of common coupling. The wind turbine controller comprises a receiving unit for receiving a measured value of a property of the wind farm taken at the point of common coupling and for receiving a reference value for the property, and a control unit for controlling the power production of the wind turbine by regulating a local property of the wind turbine based on the received measured value of the property and the received reference value of the property such that the measured value of the property of the wind farm taken at the point of common coupling corresponds to the reference value for the property.

The respective units, e.g. the control unit, may be implemented in hardware and/or in software. If said unit is implemented in hardware, it may be embodied as a device, e.g. as a computer or as a processor or as a part of a system, e.g. a computer system. If said unit is implemented in software, it may be embodied as a computer program product, as a function, as a routine, as a program code or as an executable object.

The wind turbine controller receives, via the receiving unit, one or more measured values of one or more properties of the wind farm. These values are taken at the point of common coupling (PCC), at which the wind farm is connected to a public power network, also called grid in the following.

The receiving unit further receives one or more reference values for the respective property. The reference values represent the values which should be achieved by the wind farm, i.e. by all wind turbines together, at the PCC.

The control unit then controls the wind turbine based on the measured value(s) and the reference value(s) such that the measured value(s) correspond to the reference value(s). This means that the wind turbine is controlled in order to achieve or met the reference value(s) at the PCC or at least to approach the reference value(s).

Using such a control structure, the control structure is simplified compared to common control structures using a wind farm controller instead of wind turbine controllers as the high level controller is eliminated.

According to an embodiment, the property of the wind farm is at least one of a current, a voltage, a reactive power and a power factor.

All of these properties may be measured and then used as measured values by the wind turbine controller. Reference values may be set for all or part of these properties.

According to a further embodiment, the local property of the wind turbine is at least one of a local voltage and a local active power.

By controlling or regulating these local properties, the wind turbine controller may ensure that the reference values for the PCC can be approached. The local properties influence the global properties at the PCC.

According to a further embodiment, the control unit is adapted to determine a difference between the measured value and the reference value.

When determining the difference, the control unit may regulate the local properties based on the determined difference. The difference may also be referred to as error at PCC.

According to a further embodiment, the receiving unit is adapted to receive a number of wind turbines being active within the wind farm and wherein the control unit is adapted to control the power production based on the number of wind turbines.

The information regarding the total number of active wind turbines may be used to adjust a gain of the wind turbine controller. The wind turbine controller may also be called terminal controller. In this context, the terminal voltage is the voltage at the turbine connection to the park grid and it is controlled by the turbine voltage controller.

According to a further embodiment, the wind turbine controller further comprises a monitoring unit for monitoring a value of a current set-point and/or a value of a voltage at an output terminal of the wind turbine.

In addition to control the local properties for approaching the global reference values, the monitoring unit may monitor some of the local properties so that the wind turbine can be controlled within local limits of the wind turbine, for example limits of a converter of the wind turbine. Converter in this context refers to the converter at the grid side of the wind turbine.

According to a further embodiment, the monitoring unit is adapted to generate a voltage alert signal if the value of the terminal voltage is below a lower voltage limit value or above an upper voltage limit value of a voltage range.

For the local voltage, a lower limit value and an upper limit value may be set. If the monitored voltage value goes beyond these limits, a voltage alert signal may be generated.

According to a further embodiment, the control unit is adapted to receive the voltage alert signal and to switch to a local voltage control mode, in which the control unit is adapted to control the power production of the wind turbine by regulating the local property of the wind turbine based on the voltage range.

In the normal operation mode, also called PCC-control mode, the control unit may have the voltage or the reactive power or the power-factor error at the PCC as input and may change the local voltage or reactive power in order to achieve the desired, i.e. reference, voltage or reactive power or the power factor at the PCC.

However, if the supporting of the control at the PCC drives the local, also called terminal, voltage such that the local voltage approaches either its lower or its upper limit value without saturating the converter current, a voltage controller of the control unit of the wind turbine controller switches to the local voltage control mode. As reference value to be achieved, a reference local voltage value, for example the upper or the lower limit value, are used. Thus, instead of controlling the wind turbine based on global reference values to be achieved at the PCC, a local value for the voltage at the wind turbine converter is used.

According to a further embodiment, the monitoring unit is adapted to generate a current alert signal if the value of the current set-point, which is the set-point for the Iq current component, i.e. the output of the voltage controller, is below a lower current limit value or above an upper current limit value of a current converter range.

The current converter range is the Iq current the converter can deliver. This range is defined by the limitation of the converter which is a current source.

For the local current, a lower limit value and an upper limit value may be set. If the monitored current value goes beyond these limits, a current alert signal may be generated.

According to a further embodiment, the control unit is adapted to receive the current alert signal and to switch to a local current control mode, in which the control unit is adapted to control the power production of the wind turbine by regulating the local property of the wind turbine based on the current range.

If either the normal operation or the voltage control mode leads to a current saturation of a terminal voltage controller of the wind turbine, the control unit of the wind turbine controller switches to the local current control mode. In this mode, the control unit uses a reference local current value, for example the upper or the lower limit value, as reference value to be achieved. Thus, instead of controlling the wind turbine based on global reference values to be achieved at the PCC, a local value for the current at the wind turbine converter is used.

According to a further embodiment, the control unit is adapted to turn off an integrating unit of the control unit, e.g. a voltage or reactive power controller of the control unit, when receiving the current alert signal, and to turn on the integrating unit when the value of the current set-point is within the converter current range.

The control unit may comprise a PID (proportional integral derivative) control unit. When an error occurs, for example due to a saturation of the terminal voltage controller, this error would also be integrated by the PID control unit, which leads to an increasing error in an output signal of the PID control unit. Thus, when receiving the current alert signal indicating a saturation, the integrating unit of the terminal voltage controller is turned off and the current reference points are limited with the appropriate saturation functions. The integrating unit is turned on when the current falls back within the converter current limits.

According to a further aspect, a wind turbine being arranged within a wind farm is provided. The wind turbine comprises a power production unit for producing power, and a wind turbine controller as described above for controlling the power production unit.

The wind turbine controller may control the power production unit, which comprises a grid side converter, in order to approach the reference value(s) for the PCC.

According to a further aspect, a wind farm being coupled to a public power network via a point of common coupling is provided. The wind farm comprises a plurality of wind turbines having the above mentioned features, and a wind farm administration unit for measuring a value of a property of the wind farm taken at the point of common coupling and for sending the value of the property of the wind farm and a reference value for the property to the plurality of wind turbines.

The wind farm administration unit may read for example the current and voltage measurements at the PCC and send them to all wind turbines within the wind farm together with the control mode information, e.g. reactive power, voltage or power factor.

The wind park control may have two goals: one is to regulate the active power and the other is to control additional variables such as voltage or reactive power or the power factor. Hence, in this context the control mode refers to the choice of the second variable to be controlled.

The wind farm administration unit may further send the PCC reference values to all wind turbines. The reference values may possibly be modified by droop functions.

Further, the wind farm administration unit may send the number of active wind turbines within the wind farm to all wind turbines or any other additional information for improving the stability of the control and the response time of the wind farm or wind park.

Thus, the wind farm administration unit does not determine or calculate set-points for the wind turbines as in common wind farms. Instead, the wind farm administration unit provides all information to the wind turbines which is necessary so that the wind turbines can perform a control not only to achieve their local properties but also to achieve the global properties of the wind farm taken at the PCC.

According to a further aspect, a method for controlling a power production of a wind turbine is provided, the wind turbine being arranged within a wind farm being coupled to a public power network via a point of common coupling. The method comprises receiving a measured value of a property of the wind farm taken at the point of common coupling, receiving a reference value for the property, and controlling the power production of the wind turbine by regulating a local property of the wind turbine based on the received measured value of the property and the received reference value of the property such that the measured value of the property of the wind farm taken at the point of common coupling corresponds to the reference value for the property.

According to a further aspect, the invention relates to a computer program product comprising a program code for executing the above-described method for controlling a power production of a wind turbine when run on at least one computer.

A computer program product, such as a computer program, may be embodied as a memory card, USB stick, CD-ROM, DVD or as a file which may be downloaded from a server in a network. For example, such a file may be provided by transferring the file comprising the computer program product from a wireless communication network.

The embodiments and features described with reference to the apparatus of the present invention apply mutatis mutandis to the method of the present invention.

Further possible implementations or alternative solutions of the invention also encompass combinations—that are not explicitly mentioned herein—of features described above or below with regard to the embodiments. The person skilled in the art may also add individual or isolated aspects and features to the most basic form of the invention.

BRIEF DESCRIPTION OF THE DRAWINGS

Further embodiments, features and advantages of the present invention will become apparent from the subsequent description and dependent claims, taken in conjunction with the accompanying drawings, in which:

DETAILED DESCRIPTION OF INVENTION

Figure 1:
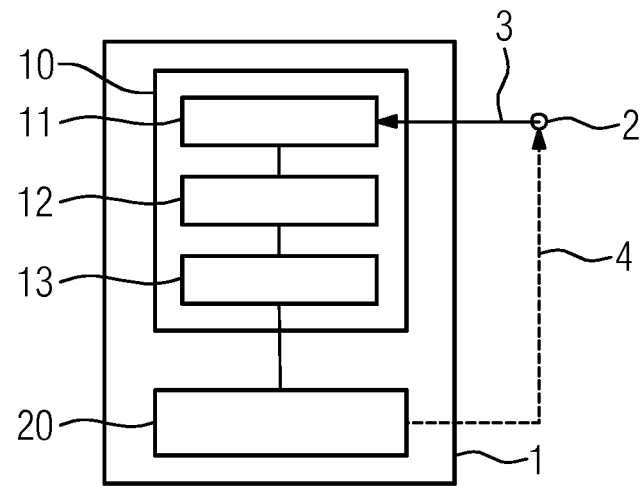
FIG. 1 shows a schematic block diagram of an embodiment of a wind turbine controller.

In the Figures, like reference numerals designate like or functionally equivalent elements, unless otherwise indicated.

FIG. 1 shows a wind turbine controller 10 for controlling a power production of a wind turbine 1. The wind turbine 1 is arranged within a wind farm 100 (shown in FIG. 2) being coupled to a public power network 6 via a point of common coupling 2.

The wind turbine controller 10 comprises a receiving unit 11, a monitoring unit 12 and a control unit 13. The receiving unit 11 receives a measured value of a property of the wind farm 100 taken at the point of common coupling 2 and receives a reference value for the property. The measured value and the reference value can be received as one signal 3.

The control unit 13 then controls the power production of the wind turbine 1 by regulating a local property of the wind turbine 1 based on the received measured value of the property and the received reference value of the property such that the measured value of the property of the wind farm 100 taken at the point of common coupling 2 corresponds to the reference value for the property. For this purpose, control unit 13 controls a power production unit 20 of the wind turbine 1. The power production unit 20, which can be a generator, produces power 4 which is then supplied to the public power network or grid 6.

The monitoring unit 12 monitors a value of a current and/or a value of a voltage at an output terminal of the wind turbine 1. If the current value or the voltage values are below a lower limit value or above an upper limit value of a defined range, the monitoring unit 12 generates an alert signal and the control 13 adjusts the power production accordingly. This behavior is explained in greater detail with reference to FIGS. 3 and 4.

Figure 2:
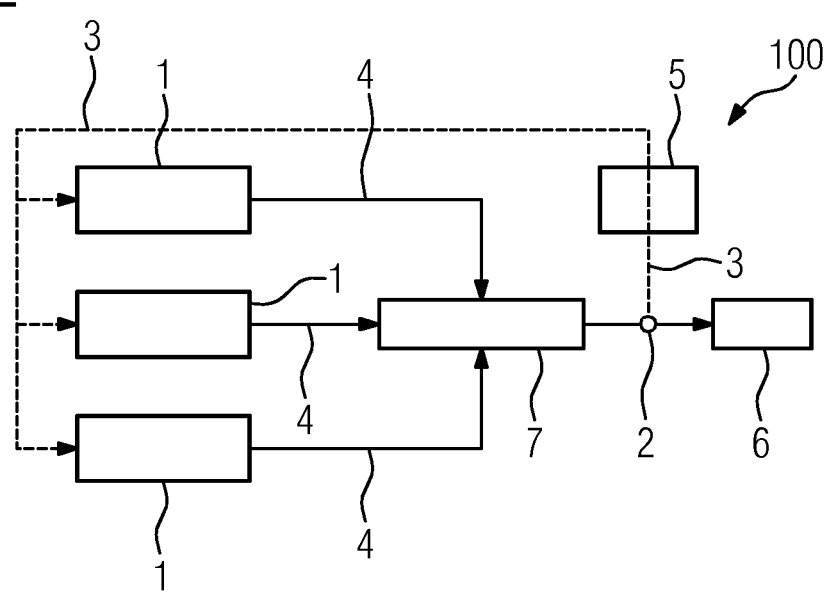
FIG. 2 shows a schematic block diagram of an embodiment of a wind farm with a plurality of wind turbines.

An overall structure of a wind farm 100 comprising a plurality of wind turbines 1 as shown in FIG. 1 is illustrated in FIG. 2.

The wind farm 100 comprises a plurality wind turbines 1 being coupled via a wind farm circuit 7 to the PCC 2. The PCC 2 connects the wind farm 100 with the grid 6. The power 4 from the wind turbines 1 is sent via the wind farm circuit 7 and the PCC 2 to the grid 6.

A wind farm administration unit 5 reads the current and voltage measurements at the PCC 2 and sends them to all turbines 1 together with the control mode information. Further, the wind farm administration unit 5 sends the PCC reference values to all turbines. Moreover, the wind farm administration unit 5 sends the number of active turbines 1 within the wind farm 100 to all turbines 1.

In the wind farm 100 as shown in FIG. 2, no central farm controller is needed. Hence, the common hierarchical farm control structure is substituted with a single-level structure.

With the wind turbine controller 10 and the wind farm 100, the following advantages can be achieved. A possible saturation of the terminal controller may be avoided since the integral action of the voltage controller is disabled as soon the converter limits are encountered (this is shown in detail with reference to FIGS. 3 and 4). The wind farm administration unit 5, also called FAU, may provide information, among others, about the number of active turbines 1 which can be used to scale the turbine controllers' gains. The overall farm control system is simplified. The farm PCC control system is faster because a farm controller is not present, i.e. the reaction to any disturbances are now delayed only due to the latency of the communication between the FAU 5 and the turbines 1 and not due to any other processing and decision making like it is the case with the common farm controller. The omission of the central farm controller may also shorten the response time of the frequency control since the turbines 1 may directly change their power generation in order to compensate the frequency deviation. The frequency-power droop function can be scaled by the number of active turbines 1 which is provided by the FAU 5. A Fault Ride Through (FRT) would be more effective in this wind farm 100 since it may consider the PCC information. The FRT control is commonly done at each wind turbine 1 without any coordination and without any information about the PCC measurements. But with the distributed control structure of the wind farm 100, a FRT response can be achieved in relation to the PCC 2 as it is also requested in the grid codes. The control of large farms 100 may be significantly simplified since no centralized controllers are needed. In common wind farms, common central farm controllers can handle only a limited number of turbines which means that several of these controllers have to be installed and coordinated with a so called master farm controller. In the herein described wind farm, no central controllers are needed.

Additional features of this distributed control scheme can be achieved in the case where the turbines 1 are time synchronized with each other. Time synchronization accuracy higher than the converter switching frequency may enable noise cancelling and general power quality improvements via distributed converter control.

Further, the described distributed control of the wind farm 100 may avoid a control signal saturation by restricting the (current) reference point within the limits of the applied converters. This is now explained with reference to FIGS. 3 and 4.

Figure 3:
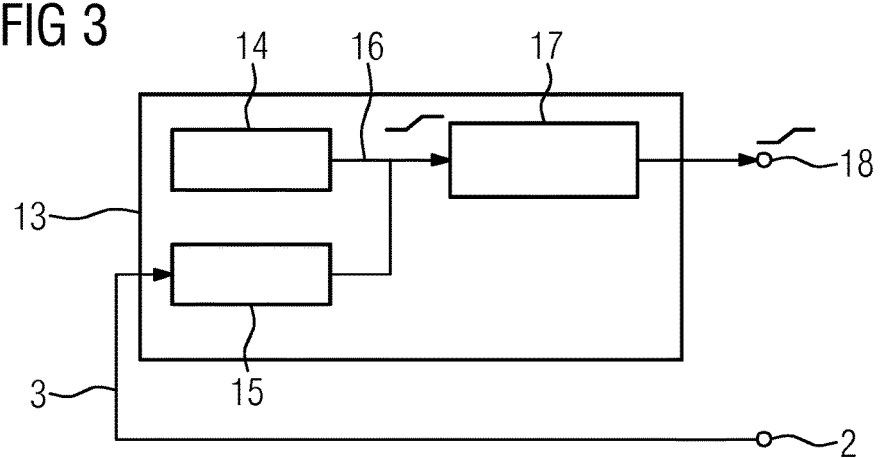
FIG. 3 shows a schematic block diagram of an embodiment of the control unit of the wind turbine controller of FIG. 1.
Figure 4:
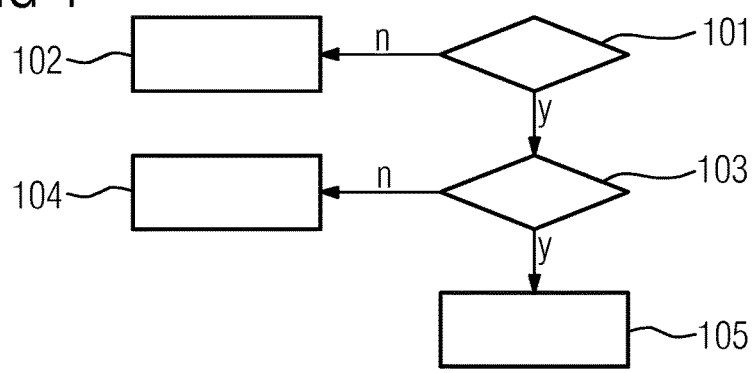
FIG. 4 shows an embodiment of a sequence of method steps for switching between different operation modes of the wind turbine controller of FIG. 1.

FIG. 3 shows the control unit 13 of FIG. 1. The control unit 13 comprises a voltage PI controller 15, an active power controller 14 and a converter PI current controller 17.

The voltage PI controller 15 produces, based on an error signal 3 from the PCC, i.e. the difference between a reference value and a measured value, a reference Iq current value Idq_ref 16 for the converter PI current controller 17. The power controller produces the reference Iq current as Id=P/|Vter|. The obtained terminal current results in the terminal voltage Vter 18. The Idq_ref signal 16 is limited by the converter characteristics. The terminal voltage magnitude |Vter| is also limited.

The monitoring unit 12 monitors these signals. In case, that any limits are exceeded, the monitoring unit generates an alert signal and the control unit 13 switches the operation mode. This is now explained with reference to FIG. 4.

In a first step 101, is it determined whether the current set point Iq at the converter is between its maximum and minimum values.

If no, the control unit 13 switches (step 102) from the normal operation mode into a local current control mode, in which no integral action in the voltage controller 15 is performed. If yes, it is determined in step 103 whether the terminal voltage magnitude |Vter| is between its maximum and minimum value.

If no, the control unit 13 switches (step 104) to the local terminal voltage control mode. If yes, the control unit 13 stays (step 105) in the normal operation mode, i.e. the PCC control mode.

Figure 5:
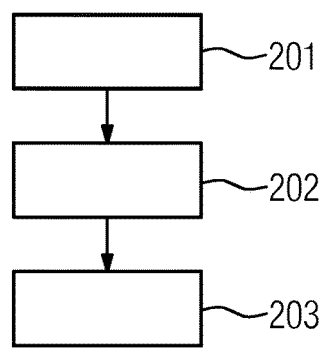
FIG. 5 shows an embodiment of a sequence of method steps for controlling a power production of a wind turbine.

FIG. 5 shows a method for controlling a power production of a wind turbine 1.

In a first step 201, a measured value of a property of the wind farm 100 taken at the point of common coupling 2 is received.

In a second step 202, which can also be simultaneous to the first step 101, a reference value for the property is received.

In a third step 203, the power production of the wind turbine 1 is controlled by regulating a local property of the wind turbine 1 based on the received measured value of the property and the received reference value of the property such that the measured value of the property of the wind farm 100 taken at the point of common coupling 2 corresponds to the reference value for the property.

Although the present invention has been described in accordance with preferred embodiments, it is obvious for the person skilled in the art that modifications are possible in all embodiments.

The respective units and/or controllers can be realized with hardware, software or in a combination by hard- and software. Hereby at least parts of the functionalities of the respective units and/or controllers can be implemented by machine-readable code that is stored in a memory and can be read and executed by a processor. The processor is connected to the memory and to one or several other units that allow an exchange of data from and/or to the processor.

The invention claimed is:

1. A wind turbine controller for controlling a power production of a wind turbine, the wind turbine being arranged within a wind farm being coupled to a public power network via a point of common coupling, the wind turbine controller comprising:
   a receiving unit for receiving a measured value of a property of the wind farm taken at the point of common coupling and for receiving a reference value for the property,
   a control unit, in communication with the receiving unit, for controlling the power production of the wind turbine in a PCC-control mode by regulating a local property of the wind turbine based on the received measured value of the property and the received reference value of the property according to a current control mode of a plurality of control modes such that the measured value of the property of the wind farm taken at the point of common coupling corresponds to the reference value for the property, and
   a monitoring unit, in communication with the control unit, for monitoring a value of a local voltage generated by the control unit to control the power production of the wind turbine,
   wherein the monitoring unit configured to generate a voltage alert signal in response to determining by the monitoring unit the value of the local voltage is below a lower voltage limit value or above an upper voltage limit value of a voltage range, and
   wherein the control unit configured to receive the voltage alert signal from the monitoring unit and, in response to the voltage alert signal, the control unit switches from the current control mode to a local voltage control mode of the plurality of control modes of the control unit, in which the control unit controls the power production of the wind turbine by regulating the local property of the wind turbine based on the voltage range.

2. The wind turbine controller according to claim 1, wherein the property of the wind farm is at least one of a current, a voltage, a reactive power and a power factor.

3. The wind turbine controller according to claim 1, wherein the local property of the wind turbine is at least one of the local voltage and a local reactive power.

4. The wind turbine controller according to claim 1, wherein the control unit is further configured to determine a difference between the measured value and the reference value.

5. The wind turbine controller according to claim 1, wherein the receiving unit is configured to receive a number of wind turbines being active within the wind farm, and wherein the control unit is further configured to control the power production based on the number of wind turbines.

6. The wind turbine controller according to claim 1, wherein the monitoring unit monitors a value of a current set-point of the wind turbine.

7. The wind turbine controller according to claim 6, wherein the monitoring unit is further configured to generate a current alert signal in response to determining by the monitoring unit the value of the current set-point is below a lower current limit value or above an upper current limit value of a current converter range.

8. The wind turbine controller according to claim 7, wherein the control unit is further configured to receive the current alert signal and to switch to a local current control mode of the plurality of control modes of the control unit, in which the control unit controls the power production of the wind turbine by regulating the local property of the wind turbine based on the current converter range.

9. The wind turbine controller according to claim 8, wherein the control unit is further configured to turn off an integrating unit of the control unit when receiving the current alert signal, and to turn on the integrating unit when the value of the current set-point is within the current converter range.

10. A wind turbine being arranged within a wind farm, the wind turbine comprising:
a power production unit for producing power, and
a wind turbine controller according to claim 1 for controlling the power production unit.

11. A wind farm being coupled to a public power network via a point of common coupling, the wind farm comprising:
a plurality of wind turbines according to claim 10, and
a wind farm administration unit for measuring a value of a property of the wind farm taken at the point of common coupling and for sending the value of the property of the wind farm and a reference value for the property to the plurality of wind turbines.

12. The wind turbine controller according to claim 1, wherein the control unit comprises a voltage controller producing a first local signal, an active power controller producing a second local signal, and a converter current controller producing a third local signal, based on an error signal from the point of common coupling wherein the monitoring unit is configured to monitor the first local signal, the second local signal and the third local signal so that the monitoring unit generates an alert signal to switch the control unit to a corresponding different control mode of the plurality of control modes of the control unit in response to the monitoring unit determining when one of the first local signal, the second local signal and the third local signal exceeds a corresponding limit.

13. A method for controlling a power production of a wind turbine, the wind turbine being arranged within a wind farm being coupled to a public power network via a point of common coupling, the method comprising:
receiving, by a wind turbine controller of the wind turbine, a measured value of a property of the wind farm taken at the point of common coupling (PCC),
receiving, by the wind turbine controller, a reference value for the property,
controlling, by a control unit of the wind turbine controller in a PCC-control mode, the power production of the wind turbine by regulating a local property of the wind turbine based on the received measured value of the property and the received reference value of the property according to a current control mode of a plurality of control modes such that the measured value of the property of the wind farm taken at the point of common coupling corresponds to the reference value for the property,
monitoring, by a monitoring unit of the wind turbine controller, a value of a local voltage generated by the control unit to control the power production of the wind turbine wherein the monitoring unit is in communication with the control unit,
generating, by the monitoring unit, a voltage alert signal in response to determining by the monitoring unit the value of the local voltage is below a lower voltage limit value or above an upper voltage limit value of a voltage range, and
switching, in response to the generated voltage alert signal, the control unit of the wind turbine controller from the current control mode to a local voltage control mode of the plurality of control modes of the control unit, in which the power production of the wind turbine is controlled by regulating the local property of the wind turbine based on the voltage range.

14. A non-transitory computer program product comprising a program code for executing the method according to claim 13, when run on at least one computer.

* * * * *